US007976900B2

(12) United States Patent
Stephan et al.

(10) Patent No.: US 7,976,900 B2
(45) Date of Patent: Jul. 12, 2011

(54) METHOD FOR PRODUCING A FIRE-RETARDANT VENEER, AND CORRESPONDING FIRE-RETARDANT VENEER

(75) Inventors: Walter Stephan, St. Martin (AT); Johann Einböck, Antiesenhofen (AT)

(73) Assignee: FACC AG, Ried im Innkreis (AT)

( * ) Notice: Subject to any disclaimer, the term of this patent is extended or adjusted under 35 U.S.C. 154(b) by 198 days.

(21) Appl. No.: 10/584,060

(22) PCT Filed: Nov. 9, 2004

(86) PCT No.: PCT/AT2004/000393
§ 371 (c)(1),
(2), (4) Date: Jun. 11, 2007

(87) PCT Pub. No.: WO2005/061221
PCT Pub. Date: Jul. 7, 2005

(65) Prior Publication Data
US 2007/0275247 A1    Nov. 29, 2007

(30) Foreign Application Priority Data
Dec. 22, 2003    (AT) ................................ A 2066/2003

(51) Int. Cl.
*B32B 5/66*    (2006.01)

(52) U.S. Cl. ..... 427/297; 427/325; 427/393; 427/372.2; 427/408; 428/536; 428/537.1

(58) Field of Classification Search .................. 428/536, 428/537.1; 427/297, 325, 393, 372.2, 408
See application file for complete search history.

(56) References Cited

U.S. PATENT DOCUMENTS

| 3,914,513 A | * | 10/1975 | Brown et al. .............. 428/425.1 |
| 4,147,332 A | | 4/1979 | Kataro et al. |
| 4,247,332 A | * | 1/1981 | Kinoshita et al. ............. 427/393 |
| 4,992,308 A | * | 2/1991 | Sunol ........................... 427/297 |
| 2010/0068518 A1 | | 3/2010 | Honma et al. |

FOREIGN PATENT DOCUMENTS

| DE | 28 23 574 A1 | 12/1978 |
| DE | 33 16 197 A1 | 11/1984 |
| DE | 198 44 431 A1 | 5/2000 |
| GB | 1 604 803 | 12/1981 |
| GB | 1604803 | * 12/1981 |

* cited by examiner

Primary Examiner — Leszek Kiliman
(74) Attorney, Agent, or Firm — Jacobson Holman PLLC

(57) ABSTRACT

For producing a fire-resistant veneer or material composite having different core materials without adding salts or other commercial fire-retardant materials, liquid is drawn out from the pores of the veneer by heat treatment and is replaced by resin, and the veneer is, if required, subjected to a refining process.

9 Claims, 1 Drawing Sheet

METHOD FOR PRODUCING A FIRE-RETARDANT VENEER, AND CORRESPONDING FIRE-RETARDANT VENEER

CROSS-REFERENCE TO RELATED APPLICATION

This is a nationalization of PCT/AT04/000393 filed Nov. 9, 2004 and published in German.

BACKGROUND OF THE INVENTION

1. Field of Invention

The invention relates to a method of producing a fire-retardant veneer or the like material or material composite that is dried by the influence of heat.

A further subject matter of the invention is a veneer produced according to the aforementioned method. An object of the invention is the production of a veneer or the like material which is flame-resistant.

In a material composite, various core materials may be provided. In all instances, preferably there are no additions of salts or other commercially available fire-retarding substances.

A further object of the invention is to provide a simple and economic method of producing thin sheets of veneer having improved properties as compared to known veneers, which veneer sheets may be used for the most varying applications both in aviation and also in other sensitive fields. These may be public facilities, ships, yachts, trains or other facilities requiring fire protection.

2. Description of the Prior Art

U.S. Pat. No. 4,247,332 A does describe a method of producing fire-retardant veneers, yet it describes the impregnation of a surface dried by the influence of heat with a water-soluble, fire-retardant agent.

198 44 431 A1 describes the impregnation of a cork barrier layer, which, however, cannot be termed a veneer as defined by the present invention.

SUMMARY OF THE INVENTION

The object mentioned above is obtained by the features of the invention described herein.

The veneer thus obtained may be subjected to a further treatment or finishing process. Thus, it is, e.g., possible to pickle the veneer and/or to treat it with lacquers, preferably with clear lacquers. With special lacquer systems, also a high-gloss surface can be produced.

The process of veneer finishing is effected under the influence of heat and pressure (0.5-7 bar) over a period of time of between 10 and 120 min. It is important that by a longer influence of heat, it becomes possible for the water in the pores of the veneer to escape and, thus, for the resin (depending on the requirements, phenol or epoxy resin) to get into the pores of the wood.

The heat (depending on the resin system and duration used, between 125° and 155° C.) is applied over the veneer. In presses, this may be effected via heated press plates, in autoclaves or in kilns via the surface of the respective tools. In case of autoclaves and kilns, the use of vacuum tools is necessary.

By substituting the water by resin, on the one hand, the negative properties of swelling and shrinking are reduced in the hydrophobic material wood, which has a positive effect on the dimensional stability, and, on the other hand, the burning behavior of the thin veneer sheet is considerably improved by a fire-resistant resin system.

The resin is introduced into the veneer by capillary action. By supplying energy in the form of heat, water bound in the pores of the veneer is caused to evaporate. The water vapor which escaping from the veneer subsequently draws the liquid resin into the pores of the veneer. In a press, pressure equalization is effected by vapor flowing out via the edges of the composite, in the autoclave and kiln via the vacuum line and/or by a thermal treatment of another type. This process may be accelerated by using perforated release papers.

Release papers, release foils or the like may also be used as a substrate to prevent the escape of resin by sucking in or pressing in after the vapor has escaped.

After curing of the resin, the veneer treated in this manner can be further processed like any other veneer.

In this finishing process, a veneer sheet assembled to the desired size (0.7 mm) is pressed together with a film of resin. The duration of compression, the temperature as well as the pressure will be different depending on the resin system used and types of wood employed. To produce material composites in the above-described process, also a core material can be co-compressed. By using a resin film, a homogeneous distribution of the resin over the entire surface of the veneer is ensured.

After having been treated with lacquers, the composite thus formed may be used for high-quality real-wood veneer furniture, i.a. in aviation. Moreover, the composite may be used in all other fields which are sensitive in terms of fire protection engineering. Because the properties of the veneer have been altered, also its swelling and shrinking behavior is significantly reduced.

Thus, by combining a resin that is already present in the impregnation of fiber fabric with various core materials, such as, e.g., honeycomb cores, light-weight and decorative composites can be produced which will also meet the high requirements of aviation.

BRIEF DESCRIPTION OF THE DRAWINGS

Further characteristic features of the invention will be explained in more detail by way of the drawings in which two exemplary embodiments have been illustrated in simplified form for the method steps for producing a refined veneer. Therein.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

According to FIG. 1, a veneer sheet 1 assembled to the desired dimension is laid onto a film of resin 2, below which a layer of a separating material, e.g. a release paper 3, is provided. After having covered the veneer sheet 1 with a further layer of a separating material, e.g. of a release paper 3', the veneer sheet 1 is compressed in the heating press. Depending on the method, resin system and temperature employed, this process may last for between 10 and 120 min (e.g. 10 min at 155° C. "hot in-hot out" method and Stesalith resin system at a pressure of 2 bar). The veneer thus obtained may be subjected to any type of refining treatment.

Figure 1:
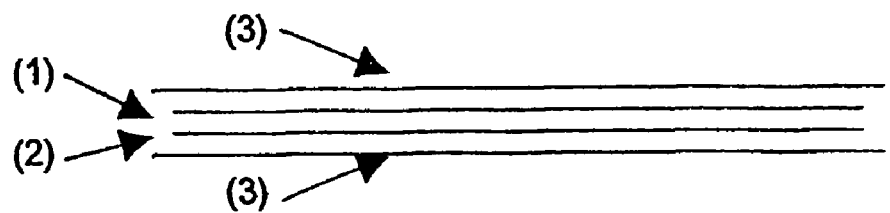
FIG. 1 shows the production of a veneer.
Figure 2:
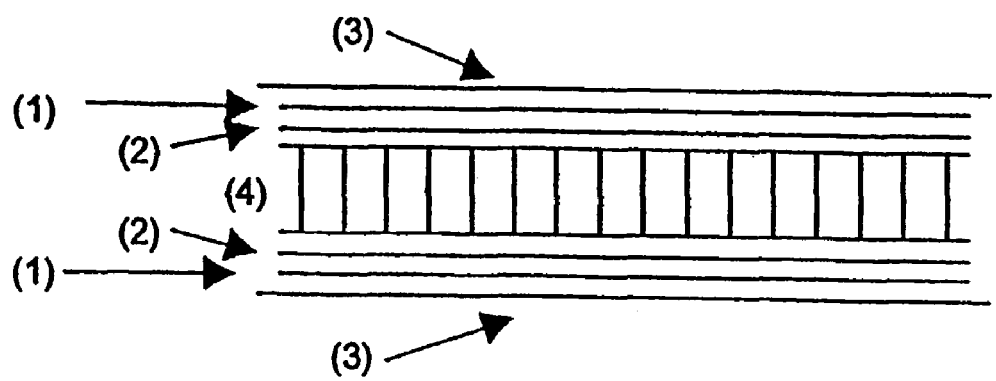
FIG. 2 shows that of a composite.

According to the exemplary embodiment of FIG. 2, two veneer sheets 1 according to FIG. 1 assembled to the desired dimension are assembled with an intermediate layer 4 of a core material having, e.g., the form of a honeycomb body with any honeycomb sections desired, e.g. in the form of a light-weight construction core. The light-weight construction core may consist of a corrugated material with plane material sheets of impregnated material arranged therebetween. The honeycomb material may be wood or metal, e.g. sheet-metal. As the resin film 2, a resin-impregnated fiber material (Prepreg) and/or similar material may be used. As the core material 4, also the material known by the tradename Nomex may be used. The composite body thus obtained is compressed in a heating press. Depending on the method, resin system and temperature used, this process may last for between 10 and 120 min (e.g. 10 min at 155° C. "hot in-hot out" method and Stesalith resin system at a pressure of 1 bar).

Within the scope of the invention, of course, also more than two veneers according to FIG. 1 may be assembled to a composite body with a respective intermediate layer of a core material.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A method of producing a fire-retardant flat structural member configured as a composite body comprising the steps of:
    providing at least two veneer sheets and an intermediate layer of a core material located therebetween to provide the composite body;
    disposing a resin film between the intermediate layer of the core material and the respective veneer sheet on each side of the intermediate layer, the veneer sheets having pores; and
    supplying heat to the veneer sheets such that (i) water bound in the pores of the veneer sheets evaporates and is exhausted from the pores thereof and (ii) the resin films are liquefied by the heat, the exhausting evaporated water drawing the liquefied resin films into the pores of the veneer sheets by capillary action,
    the step of heating being effected under an applied pressure such that the evaporated water exhausted from the pores flows out through edges of the member.

2. The method according to claim 1, wherein each of the veneer sheets includes a separating material provided on one side thereof, and wherein the heating step is effected in a device that supplies the heat.

3. The method according to claim 1, wherein a fabric is arranged between the intermediate layer of the core material and each of the respective veneer sheets.

4. The method according to claim 2, wherein the separating material is at least one of a release paper and a release foil.

5. The method according to claim 2, wherein the device is at least one of a heating press and an autoclave.

6. The method according to claim 3, wherein the fabric is a fiber fabric.

7. The method according to claim 3, wherein the fabric is resin-impregnated.

8. The method according to claim 1, wherein the applied pressure is from 0.5 to 7 bar.

9. The method according to claim 1, wherein the fire-retardant flat structural member is produced over a period of time of from 10 to 120 minutes.

* * * * *